United States Patent
Chen

(10) Patent No.: US 7,954,103 B2
(45) Date of Patent: May 31, 2011

(54) METHOD FOR PREVENTING PROCESS COLLISION OF MICRO CONTROLLER

(75) Inventor: Nung-Kai Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 1336 days.

(21) Appl. No.: 11/462,273

(22) Filed: Aug. 3, 2006

(65) Prior Publication Data

US 2007/0288928 A1    Dec. 13, 2007

(30) Foreign Application Priority Data

Jun. 8, 2006    (TW) ................................ 95120333 A

(51) Int. Cl.
*G06F 9/46* (2006.01)

(52) U.S. Cl. ........................................ 718/102; 718/100

(58) Field of Classification Search .................. None
See application file for complete search history.

(56) References Cited

U.S. PATENT DOCUMENTS

| | | | | |
|---|---|---|---|---|
| 5,606,695 | A | 2/1997 | Dworzecki | 395/208 |
| 5,944,778 | A * | 8/1999 | Takeuchi et al. | 718/100 |
| 7,165,252 | B1 * | 1/2007 | Xu | 718/102 |
| 7,512,947 | B2 * | 3/2009 | Moore | 718/102 |

* cited by examiner

*Primary Examiner* — Meng-Ai An
*Assistant Examiner* — Tammy Lee
(74) *Attorney, Agent, or Firm* — J.C. Patents

(57) ABSTRACT

A method for preventing process collision of a micro controller is disclosed. The method includes the following steps. At least a first process and a second process are provided, wherein the first process is executed by the micro controller in every first period, the second process is executed by the micro controller in every second period, and the first period is shorter than the second period. When collision of the first process and the second process may happen in the second period, the executing time of the second process is shifted a predetermined time.

5 Claims, 4 Drawing Sheets

| TIME (ms) | 5ms | 15ms | 20ms | 50ms | 100ms | 300ms | 500ms | 1000ms |
|---|---|---|---|---|---|---|---|---|
| 0 | V | | | | | | | |
| 1 | | V | | | | | | |
| 2 | | | V | | | | | |
| 3 | | | | V | | | | |
| 4 | | | | | V | | | |
| 5 | V | | | | | | V | |
| 6 | | | | | | | V | |
| 7 | | | | | | | | V |
| 10 | V | | | | | | | |
| 11 | | V | | | | | | |
| 15 | V | | | | | | | |
| 20 | V | | | | | | | |
| 21 | | V | | | | | | |
| 22 | | | V | | | | | |
| 25 | V | | | | | | | |
| 30 | V | | | | | | | |
| 31 | | V | | | | | | |
| 35 | V | | | | | | | |
| 40 | V | | | | | | | |
| 41 | | V | | | | | | |
| 42 | | | V | | | | | |
| 45 | V | | | | | | | |
| 50 | V | | | | | | | |
| 51 | | V | | | | | | |
| 53 | | | | V | | | | |
| 55 | V | | | | | | | |
| 60 | V | | | | | | | |
| 61 | | V | | | | | | |
| 62 | | | V | | | | | |
| 65 | V | | | | | | | |
| 70 | V | | | | | | | |
| 71 | | V | | | | | | |
| 75 | V | | | | | | | |
| 80 | V | | | | | | | |
| 81 | | V | | | | | | |
| 82 | | | V | | | | | |
| 85 | V | | | | | | | |
| 90 | V | | | | | | | |
| 91 | | V | | | | | | |
| 95 | V | | | | | | | |
| 100 | V | | | | | | | |
| 101 | | V | | | | | | |
| 102 | | | V | | | | | |
| 103 | | | | V | | | | |
| 104 | | | | | V | | | |

FIG. 4

| TIME (ms) | 5ms | 10ms | 20ms | 50ms | 100ms | 300ms | 500ms | 1000ms |
|---|---|---|---|---|---|---|---|---|
| 0 | V | | | | | | | |
| 1 | | V | | | | | | |
| 2 | | | V | | | | | |
| 3 | | | | V | | | | |
| 4 | | | | | V | | | |
| 5 | V | | | | | | | |
| 6 | | | | | | V | | |
| 7 | | | | | | | V | |
| 8 | | | | | | | | V |
| 10 | V | | | | | | | |
| 11 | | V | | | | | | |
| 15 | V | | | | | | | |
| 20 | V | | | | | | | |
| 21 | | V | | | | | | |
| 22 | | | V | | | | | |
| 25 | V | | | | | | | |
| 30 | V | | | | | | | |
| 31 | | V | | | | | | |
| 35 | V | | | | | | | |
| 40 | V | | | | | | | |
| 41 | | V | | | | | | |
| 42 | | | V | | | | | |
| 45 | V | | | | | | | |
| 50 | V | | | | | | | |
| 51 | | V | | | | | | |
| 53 | | | | V | | | | |
| 55 | V | | | | | | | |
| 60 | V | | | | | | | |
| 61 | | V | | | | | | |
| 62 | | | V | | | | | |
| 65 | V | | | | | | | |
| 70 | V | | | | | | | |
| 71 | | V | | | | | | |
| 75 | V | | | | | | | |
| 80 | V | | | | | | | |
| 81 | | V | | | | | | |
| 82 | | | V | | | | | |
| 85 | V | | | | | | | |
| 90 | V | | | | | | | |
| 91 | | V | | | | | | |
| 95 | V | | | | | | | |
| 100 | V | | | | | | | |
| 101 | | V | | | | | | |
| 102 | | | V | | | | | |
| 103 | | | | V | | | | |
| 104 | | | | | V | | | |

FIG. 5

METHOD FOR PREVENTING PROCESS COLLISION OF MICRO CONTROLLER

CROSS-REFERENCE TO RELATED APPLICATION

This application claims the priority benefit of Taiwan application serial no. 95120333, filed on Jun. 8, 2006. All disclosure of the Taiwan application is incorporated herein by reference.

BACKGROUND OF THE INVENTION

1. Field of the Invention

The present invention relates to a processing method of a micro controller. More particularly, the present invention relates to a method for preventing process collision of a micro controller.

2. Description of Related Art

With the result of constant development of technology, the micro controllers (MCU) are applied to many products, such as the embedded controller for detecting computer temperature, the keyboard controller (KBC) for controlling keyboard and interface of personal computer, and the controller for controlling liquid crystal display, etc. Generally, 80-series controllers (8046, 8051 etc) are used for such micro controllers applications.

Generally speaking, micro controllers are usually used for processing some routine programs, for example, detecting state changes of GPIO pins of a south bridge chip in a computer, detecting battery capacity information through SM bus, detecting temperature and LED indicator light etc. Such routine programs are usually executed at regular intervals, for example, a keyboard controller executes a $1^{st}$ program every 5 ms, a $2^{nd}$ program every 10 ms, a $3^{rd}$ program every 20 ms, a $4^{th}$ program every 50 ms, a $5^{th}$ program every 100 ms, a $6^{th}$ program every 300 ms, a $7^{th}$ program every 500 ms, and an $8^{th}$ program every 1000 ms. However, collisions may happen at common multiples of the intervals of the programs when the foregoing programs are executed, for example, collision of the $1^{st}$ program and the $2^{nd}$ program may happen at 10 ms, here the execution of the $1^{st}$ program having 5 ms period may be delayed.

According to the example described above, at the least common multiple 3000 ms of the periods of all the foregoing programs, collision of all the programs may happen, which will result in delay in the execution of the programs. If it happens to be the first program whose execution is delayed and the time delayed exceeds 5 ms, the system BIOS program will time out or misjudge sequentially, or even worse, system panic may be caused.

SUMMARY OF THE INVENTION

Accordingly, the present invention is directed to provide a method for preventing process collision of a micro controller, so that when the processor has to process at least two processes periodically, collision or interruption of the processes will not occur, and further, system panic can be prevented.

The present invention provides a method for preventing process collision of a micro controller. The method includes the following steps. At least a first process and a second process are provided, wherein the first process is executed by the micro controller in every first period, and the second process is executed by the micro controller in every second period. When collision of the first process and the second process may happen in the second period, the executing time of the second process is shifted a predetermined time.

According to the method for preventing process collision of a micro controller in an exemplary embodiment of the present invention, the foregoing micro controller is used for processing N processes respectively corresponding to N execution periods, the N execution periods have a greatest common divisor and the $K^{th}$ execution period is shorter than the $(K+1)^{th}$ execution period, wherein N and K are natural numbers and $0<K<=N$.

According to the method for preventing process collision of a micro controller in an exemplary embodiment of the present invention, when the least common multiple of the foregoing N execution periods is not equal to the multiple of the foregoing N execution periods, the execution of the $I^{th}$ process is delayed I times of the predetermined time, wherein I is a natural number and $0<I<=N$.

According to the method for preventing process collision of a micro controller in an exemplary embodiment of the present invention, when the $J^{th}$ execution period is equal to the greatest common divisor, the processes after the $J^{th}$ process are further delayed one unit of the predetermined time. In an embodiment, the predetermined time is a unit time and which is 1 ms.

In the present invention, delay of predetermined time is used to separate the rutine programs, so that when the processor has to process at least two processes periodically, collision or interruption will not occur, and further, system panic can be prevented.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 and FIG. 5 are distribution diagrams of the processes in the embodiment as illustrated in FIG. 3.

DESCRIPTION OF EMBODIMENTS

Figure 1:
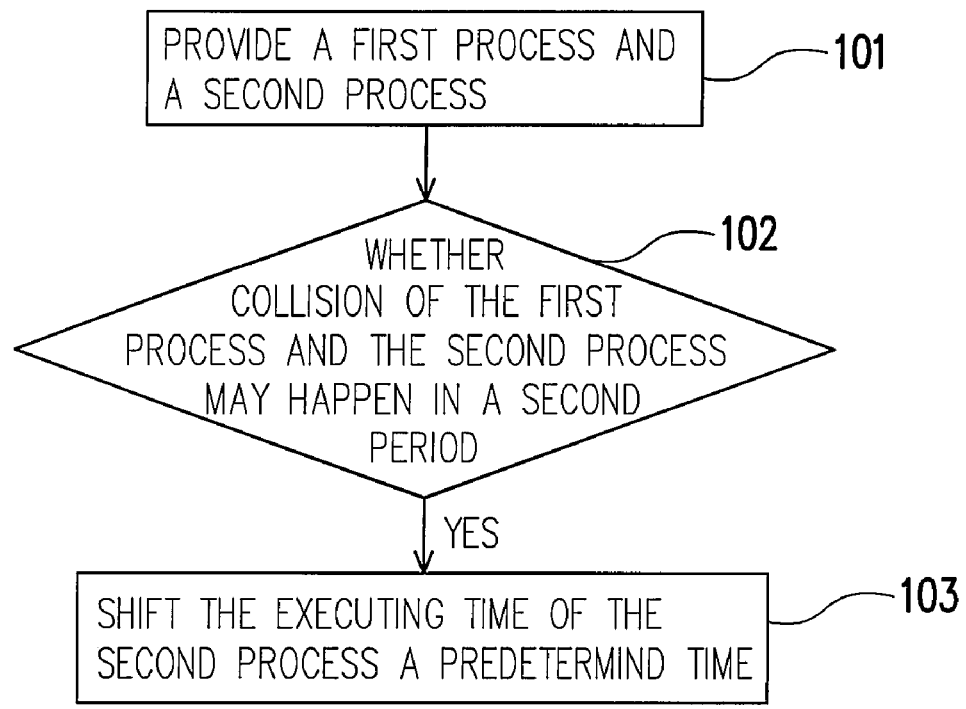
FIG. 1 is a flowchart illustrating the method for preventing process collision of a micro controller according to an embodiment of the present invention.
Figure 2:
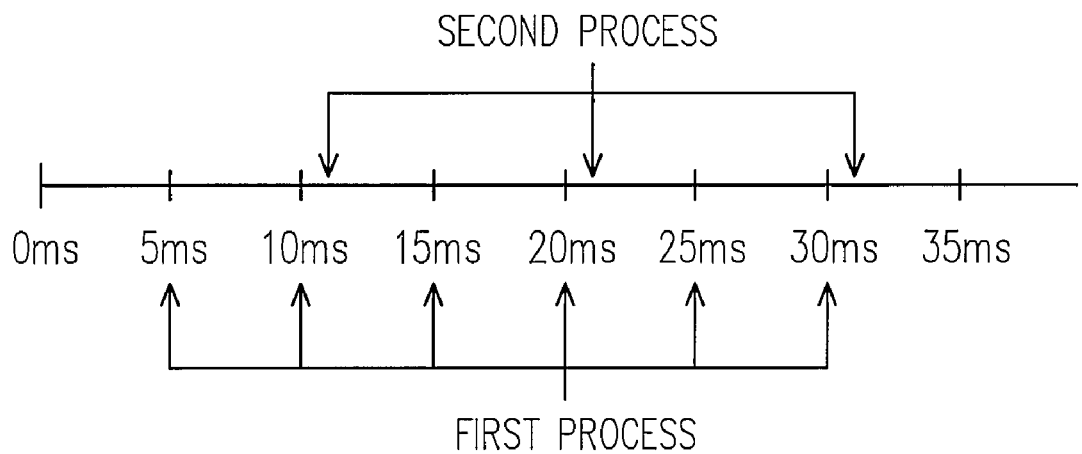
FIG. 2 is a timing diagram of the processes according to the embodiment illustrated in FIG. 1.

FIG. 1 is a flowchart illustrating the method for preventing process collision of a micro controller according to an embodiment of the present invention. FIG. 2 is a timing diagram of the processes according to the embodiment illustrated in FIG. 1. Referring to FIG. 1, first, a first process and a second process are provided, wherein the first process is executed by the micro controller in every first period (for example 5 ms), and the second process is executed by the micro controller in every second period (for example 10 ms)

(step 101). Whether collision of the first process and the second process will happen in the second period (10 ms) is determined (step 102). When collision of the first process and the second process will happen in the second period (10 ms), the executing time of the second process is shifted a predetermined time (for example 2 ms) (step 103), as shown in FIG. 2.

A possible pattern of the method for preventing process collision of micro controller has been introduced in the foregoing embodiment. Below, another embodiment with 8 processes will be explained so that those skilled in the art can easily implement the present invention.

Figure 3:
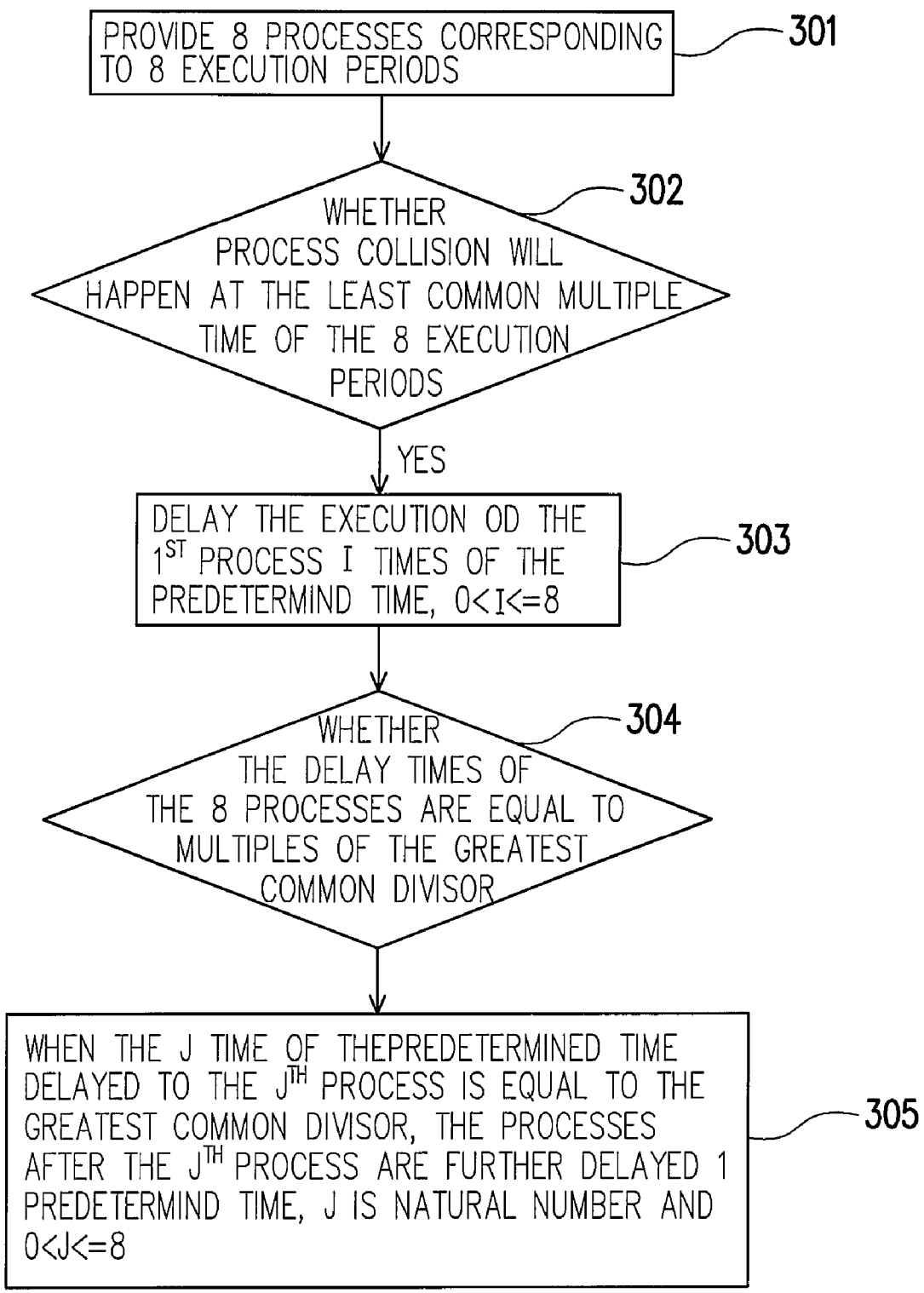
FIG. 3 is a flowchart illustrating the method for preventing process collision of a micro controller according to an embodiment of the present invention.

FIG. 3 is a flowchart illustrating the method for preventing process collision of a micro controller according to an embodiment of the present invention. FIG. 4 and FIG. 5 are distribution diagrams of the processes in the embodiment as illustrated in FIG. 3. First, 8 processes are provided, and the micro controller is used for processing the 8 processes. The $1^{st}$ process is executed every 5 ms, the $2^{nd}$ process is executed every 10 ms, the $3^{rd}$ process is executed every 20 ms, the $4^{th}$ process is executed every 50 ms, the $5^{th}$ process is executed every 100 ms, the $6^{th}$ process is executed every 300 ms, the $7^{th}$ process is executed every 500 ms, and the $8^{th}$ process is executed every 1000 ms (step 301). The 8 processes respectively correspond to 8 execution periods, and the 8 execution periods have a greatest common divisor 3000 ms.

Whether process collision will happen at the least common multiple time of the foregoing 8 execution periods is determined (step 302). When process collision will happen at the least common multiple time of the 8 execution periods, the execution of the $I^{th}$ process is delayed I times of the predetermined time (step 303). For example, the $1^{st}$ process is delayed 1 ms, the $2^{nd}$ process is delayed 2 ms etc. Next, whether the delay times of the foregoing 8 processes are equal to multiples of the greatest common divisor is determined (step 304). When it is determined that the delayed of the $6^{th}$ process (5 ms) is equal to the greatest common divisor of said 8 execution period, the processes 6~8 are respectively delayed 1 ms (step 305), here the $6^{th}$ process is delayed 6 ms, the $7^{th}$ process is delayed 7 ms, and the $8^{th}$ process is delayed 8 ms so that process collisions can be avoided.

In overview, delays of predetermined time are used in the present invention to separate the rutine programs so that when the processor has to process at least two processes periodically, collision or interruption will not occur, and further, system panic can be prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for preventing process collision of a micro controller, comprising:
   providing at least a first process and a second process, wherein the first process is executed by the micro controller in every first period, the second process is executed by the micro controller in every second period, and the first period is shorter than the second period;
   when collision of the first process and the second process will happen in the second period, the executing time of the second process is shifted a predetermined time; and
   wherein when process collision will happen at the least common multiple time of N execution periods, the execution of the $l^{th}$ process is delayed l times of the predetermined time, N and l are natural numbers and $0 < l <= N$.

2. The process collision preventing method as claimed in claim 1, wherein the micro controller is used for processing N processes respectively corresponding to the N execution periods, the N execution periods have a greatest common divisor, and the $K^{th}$ execution period is shorter than the $(K+1)^{th}$ execution period, K is a natural number, $0 < K <= N$.

3. The process collision preventing method as claimed in claim 2, wherein when the J times of the predetermined time delayed to the $J^{th}$ execution period is equal to the greatest common divisor, the processes after the $J^{th}$ process are further delayed the predetermined time, J is a natural number and $0 < J <= N$.

4. The process collision preventing method as claimed in claim 3, wherein the predetermined time is a unit time.

5. The process collision preventing method as claimed in claim 4, wherein the unit time is 1 ms.

* * * * *